Nov. 9, 1965   L. N. WILLIAMS   3,216,068
SEAL
Filed March 30, 1961
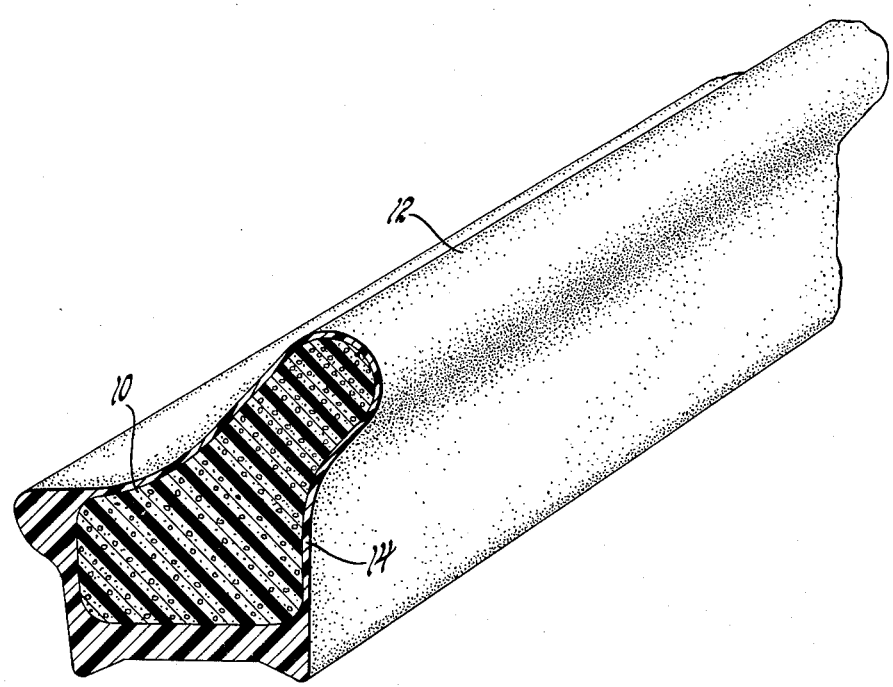
INVENTOR.
BY Lyle N. Williams
Peter P. Kozak
ATTORNEY

United States Patent Office 3,216,068
Patented Nov. 9, 1965

3,216,068
SEAL
Lyle N. Williams, Anderson, Ind., assignor to General Motors Corporation, Detroit, Mich., a corporation of Delaware
Filed Mar. 30, 1961, Ser. No. 99,581
4 Claims. (Cl. 20—69)

This invention relates to foamed vinyl resin articles and more particularly to an elastic vinyl resin foam type sealing strip useful for sealing automobile body doors and the like.

Related subject matter is disclosed in the United States patent application Serial No. 17,518, filed March 25, 1960, now Patent No. 3,170,967, in the names of Llyle N. Williams, Harry R. Alley and Harold K. Barnhizer and assigned to the assignee of the present invention.

It has been proposed in the past to manufacture automobile weatherstrips, seat cushions and the like from vinyl resin foam compositions since vinyl resins are relatively cheap and may be economically manufactured and molded. Insofar as it is known, vinyl resin foams have never been adopted successfully for automotive use. It is believed that the reason for this failure has been due principally to the fact that the known vinyl resin foams which were satisfactory in other respects had poor low temperature characteristics, particularly in that at temperatures in the neighborhood of 0° F. or less, the foam became relatively rigid. At these temperatures vinyl foam seat cushions lost much cushioning effectiveness and vinyl foam weatherstrips lost much sealing effectiveness and interfered with an efficient closing of automobile doors. Moreover, such vinyl foam had a relatively large compression set in the neighborhood of 30% to 40%. In contrast to this, other foam materials such as foam rubber which is extensively used for automotive weatherstripping purposes has a compression set in the neighborhood of only 10% to 15%.

It is the basic object of this invention to provide an economical, efficient and abrasion-resistant sealing strip for use on automobile doors and the like which consists of a vinyl resin foam having a moisture-impervious, adherent, flexible vinyl resin skin or coating layer and has a compression set in the neighborhood of 10% to 15% or less and a high degree of low temperature flexibility.

These and other objects of the invention are accomplished by the provision of an elongated two-part mold having an elongated cavity therein of the shape of the sealing strip to be made. The upper and lower portions of the mold are each provided with heating means whereby each mold half may be heated individually and selectively. In the manufacture of a vinyl foam sealing strip of this invention the mold members are assembled in a closed position and a liquid vinyl plastisol having a relatively low plasticizer content in the neighborhood of 75 parts of plasticizer to 100 parts by weight of a vinyl resin such as polyvinyl chloride is poured into the mold cavity so as to completely fill it. Meanwhile, the mold halves are heated to the gelling temperature of the vinyl plastisol. The vinyl plastisol is permitted to remain in the heated mold cavity for a time sufficient to cause a vinyl plastisol layer of a predetermined thickness to gel and build up adjacent the mold cavity surfaces. The remaining liquid vinyl plastisol is removed from the mold and then a vinyl plastisol having a high plasticizer content in the neighborhood of 150 parts of plasticizer to 100 parts of a vinyl resin such as polyvinyl chloride and including a suitable blowing agent capable of decomposing and releasing a gas at an elevated temperature below the fusion temperature of the vinyl plastisol is then deposited in the mold cavity adjacent the gelled layer of low plasticizer content vinyl plastisol. The mold is then heated to at least a temperature in which the blowing agent decomposes whereby the foamable vinyl material is caused to expand and completely fill the mold cavity with a cellular, sponge-like material. The mold is then further heated to at least the fusion temperature of the plastisol. The high plasticizer content vinyl core material as well as the low plasticizer content thin layer adjacent the mold cavity surfaces is fused together to form a sealing strip composed of a vinyl resin sponge core having a relatively impervious polyvinyl resin surface layer coextensively fused thereto. The sealing strip has good low temperature flexibility due to the high plasticizer level of the sponge core. The low plasticizer level surface layer prevents the ingress of water into the sponge core and prevents the exudation of plasticizer from the weather strip.

Other objects and advantages will more fully appear from the following detailed description of a preferred embodiment of the invention which is described in connection with the accompanying drawing which shows a sealing strip in accordance with the invention.

As previously stated, this invention is concerned primarily with the manufacture of a sealing strip preferably of the type employed in connection with the sealing of automobile doors which has excellent low temperature flexibility characteristics. In accordance with the invention a sealing strip is provided which has a foamed elastic vinyl resin inner structure encased in and coextensively fused to a relatively thin, flexible outer layer of a vinyl resin.

The drawing illustrates a cross-sectional view of a sealing strip of this invention. The seal may be of indefinite length but may be most conveniently formed in lengths of about 14 feet. The sealing strip preferably consists of a polyvinyl foam main body portion 10 which includes a sealing lip portion 12. The vinyl resin foam portion 10 is encased in a solid impervious relatively thin polyvinyl layer 14 which is fused to the foamed body core portion 10.

The apparatus and process for forming the sealing strip is disclosed in the aforementioned patent application Serial No. 17,518. Briefly, the process involves the use of an elongated mold which is preferably mounted on a support in a teeter-totter fashion whereby each end of the mold can be alternately raised to the position above the opposite end of the mold to encourage gravity flow of vinyl plastisols therethrough and an efficient filling of the mold. Each mold half is provided with heating elements in the form of oil passages whereby the upper and lower mold sections may be heated independently.

In the process of making a section of weatherstripping, the mold is tilted so that one end thereof is raised appreciably above the opposite end. The mold is then filled at the high end with a vinyl plastisol which is particularly adapted for use in the formation of the skin 14 of the weatherstrip. The mold is then heated to the gelling temperature of the plastisol and maintained at this temperature for a time sufficient to cause a thin layer of the plastisol to gel and be formed on the mold surface. The remaining ungelled plastisol is then withdrawn from the mold preferably by a vacuum technique and thereafter a predetermined quantity of a foamable vinyl plastisol is injected into the mold cavity and the mold is heated to a temperature sufficient to cause the blowing agent within the foamable vinyl plastisol to expand and completely fill the mold cavity.

Next, the mold is heated to the fusion temperature of the vinyl plastisol which is typically within the range of between about 320° F. and 360° F. for a time sufficient to cause a fusion of the foamed plastisol core 10 as well as the skin layer 12. In the course of the fusion process the skin layer 12 fuses to the core mass 10 whereby the two are fused together.

After the weatherstrip has been subject to a fusion heat treatment which as above described involves heating the foam and skin layer to a temperature between about 320° F. and 360° F. for a time sufficient to effect fusion, the weatherstrip is permitted to cool to approximately room temperature. As described in the aforementioned patent application Serial No. 17,518, a subsequent heat aging in a temperature range of about 175° F. to 200° F. for a period in the neighborhood of four hours or more surprisingly operates to reduce the permanent set of the foam to about 10% to 15%. The term "set" as used herein is intended to mean the degree in terms of percent a given thickness of foam is reduced on being subjected to sustained compression. The particular test involved herein involves subjecting the foam weatherstrip to compression force of approximately 22 hours at 158° F. The comparisons of different compression sets described herein all involve an identical testing procedure.

A very important aspect of this invention resides in the plastisol formulation of the skin layer 12 in contrast to the formulation of the foam core 10. These two formulations cooperate to provide a weatherstrip which has excellent low temperature flexibility and which, when heat aged as indicated above, has good permanent set characteristics of not more than about 10% to 15% which corresponds favorably with rubber latex foams and which has no appreciable tendency to exude or bleed plasticizer which in the past has proved to be very troublesome in the provision of vinyl plastisol products with good low temperature flexibility.

In a preferred embodiment of the invention the skin layer 14 is formed of a plastisol consisting of the following ingredients:

| | Parts by weight |
|---|---|
| Plastisol grade polyvinyl chloride resin | 100 |
| Plasticizer | 75 |
| Dibasic lead phosphite | 2 |
| Carbon | 1 |

The carbon is added in the form of carbon black and serves as a dye. It may, if desired, be eliminated or replaced by other suitable dye materials. The dibasic lead phosphite is a heat and light stabilizer. An important aspect of this formulation resides in the ratio of the plasticizer to the resin which in its preferred form is 75 parts by weight of the former to 100 parts by weight of the latter. Preferably this plasticizer in turn is formed of about 30 parts by weight of dioctyl adipate and 40 parts by weight of a polymeric epoxidized vegetable oil such as linseed or cotton seed oil having an oxirane content of about 5% to 7% and a degree of unsaturation represented by an iodine number of about 0.5 to 1.5. Plasticizers of this type are disclosed in the United States Patent No. 2,822,368. The epoxidized vegetable oil plasticizer imparts good heat and light stability to the skin and tends to promote low temperature flexibility. The dioctyl adipate also promotes good low temperature flexibility. In the preferred embodiment of the invention the dioctyl adipate is present in a range of from about 40% to 60% by weight of the plasticizer.

The sponge or foam core portion of the weatherstrip 10 is preferably formed of the following formulation:

| | Parts by weight |
|---|---|
| Plastisol grade polyvinyl chloride resin | 100 |
| Plasticizer | 150 |
| Dibasic lead phosphite | 3 |
| Carbon | 1 |
| Blowing agent | 2.5 |

The blowing agent in the above formulation is preferably N,N'-dinitroso-N,N'-dimethyl terephthalamide which decomposes in the neighborhood of 175° F. The carbon in the form of carbon black serves as a dye material. The carbon black may be omitted or replaced by other dye materials. The plasticizer preferably consists of 65 parts by weight dioctyl adipate, 20 parts by weight of a polyester plasticizer which is the reaction product of adipic acid and a butane diol, preferably 1,3 butane diol, and 65 parts by weight of a plasticizer having good heat and light stability consisting of an epoxidized vegetable oil having an axirane content of 5% to 7% and a degree of unsaturation represented by an iodine number of about 0.5 to 1.5. Useful formulations may be had in which the plasticizer content varies between 145 and 155 parts by weight per 100 parts by weight of the resin. The preferred weatherstrips are obtained where the epoxidized vegetable oil plasticizer is held between about 40% and 46% by weight, the polyester plasticizer between about 12% and 16% by weight and the dioctyl adipate plasticizer between 40% and 46% by weight of the total plasticizer of the sponge core. The blowing agent in the sponge formulation may be present in amounts ranging from 1 to 8 parts by weight and preferably 2 to 4 parts by weight.

The high level of the plasticizer in the foam core composition provides the weatherstrip with satisfactory low temperature flexibility. However, at this high plasticizer level, there is a strong tendency for the plasticizer to exude or bleed from the fused plastisol which would normally feel oily to the touch and be rubbed off on objects coming in contact therewith such as clothes, etc. The low level plasticizer skin layer 12 which in the process of making the weatherstrip is fused to the sponge core and forms an integral part thereof is in itself substantially free of plasticizer exudation or bleeding and further serves to prevent significant exudation of the plasticizer from the sponge core to the external surfaces of the weatherstrip. In this way, the weatherstrip structure is obtained which combines low temperature flexibility heretofore unobtainable without the serious disadvantage of substantial plasticizer exudation. Insofar as it is known, vinyl structures of this type have heretofore been unattained.

Satisfactory low temperature flexibility of the weatherstripping for automotive body uses involves a comparison of the flexibility at room temperatures taken to be about 78° F. and a low temperature of about −20° F. A satisfactory low temperature flexibility is achieved when the amount of force needed to deflect the weatherstrip sealing lip 12 a prescribed amount does not take more than about twice as much force at the low −20° F. temperature than at room temperature of about 78° F. The specific test employed involves the use of a six inch length of the weatherstripping and subjecting the weatherstrip at the room temperature of 78° F. The force needed to deflect the sealing lip 12 to 0.378 inch is measured. Then the deflection measurement is repeated at −20° F. Satisfactory low temperature flexibility is achieved when the force required to deflect 0.378 inch at the low temperature is not more than about twice as large as the force required at the high temperature.

The term "vinyl plastisol" as used herein is intended to refer to a dispersion of a vinyl resin such as polyvinyl chloride in a plasticizer together with stabilizers, dyes and the like such as those described above. The plastisol is intended to refer to the type of composition in which the resin is not appreciably soluble in the plasticizer at room temperature but in which the resin becomes soluble in the plastisol at an elevated temperature. At the elevated temperature the dispersion of the resin in the plasticizer is converted into a solution with the result that the plastisol thickness, gels and fuses into a single phase.

It will be understood that other vinyl resins such as polyvinyl chloride-acetate copolymers and vinyl chloride diethyl maleate copolymers may be employed. Other plasticizers besides those mentioned may be employed which provide the plastisol with desirable heat and light stability and tend to impart low temperature flexibility thereto as above described may be substituted for those set forth in the above formulations.

While the embodiments of the present invention as herein described constitute a preferred form, it is to be understood that other forms may be adopted within the spirit of the invention as defined in the appended claims.

I claim:

1. A sealing strip comprising a foamed flexible polyvinyl resin main body portion having a flexible outer layer of moisture-impervious polyvinyl resin integrally formed and fused therewith, said main body portion being formed of a foamable plastisol comprising between about 145 and 155 parts by weight of a plasticizer per 100 parts by weight of polyvinyl resin and small amounts of a blowing agent and said outer layer being formed of a plastisol comprising 65 to 85 parts by weight of a plasticizer per 100 parts by weight of a polyvinyl resin, said outer layer forming an effective barrier against the exudation of plasticizer from said main body portion.

2. A sealing strip comprising a foamed flexible polyvinyl resin main body portion having a flexible outer layer of a moisture-impervious polyvinyl resin integrally formed and fused therewith, said main body portion being formed of a foamable plastisol having a relatively high plasticizer level in excess of about 145 parts by weight plasticizer per 100 parts by weight of the resin, said outer layer being formed of a plastisol having a relatively low plasticizer level not in excess of about 85 parts by weight of the plasticizer per 100 parts of the resin, said outer layer forming an effective barrier against the exudation of plasticizer from said main body portion, said plasticizer levels being adjusted so that the force required to deflect the sealing lip of said strip 0.378 inch at −20° F. is not more than twice the force required to deflect said strip said amount at 78° F.

3. A sealing strip comprising a foamed flexible polyvinyl resin main body portion having a flexible outer layer of moisture-impervious vinyl resin integrally formed and fused therewith, said main body portion being formed of a foamable plastisol comprising 145 to 155 parts by weight of a plasticizer per 100 parts by weight of polyvinyl chloride resin and said outer layer being formed of a plastisol comprising 65 to 85 parts by weight of a plasticizer per 100 parts by weight of a resin, said outer layer forming an effective barrier against the exudation of plasticizer from said main body portion, said plasticizer levels being adjusted so that the force required to deflect the sealing lip of said strip 0.378 inch at −20° F. is not more than about twice the force required to deflect said strip said amount at 78° F.

4. A sealing strip comprising a foamed flexible polyvinyl resin main body portion having a flexible outer layer of moisture-impervious vinyl resin integrally formed and fused therewith, said main body portion being formed of a foamable plastisol comprising between 145 and 155 parts by weight of a first plasticizer per 100 parts by weight of polyvinyl chloride resin and said outer layer being formed of a plastisol comprising 65 to 85 parts by weight of a second plasticizer per 100 parts by weight of a resin, said first plasticizer comprising about 40% to 46% by weight of an epoxidized vegetable oil having an oxirane content of 5% to 7% and a degree of unsaturation represented by an iodine number of about 0.5 to 1.5, about 12% to 16% by weight of a polyester which is the reaction product of adipic acid and a butane diol and about 40% to 46% by weight of dioctyl adipate, said second plasticizer comprising 40% to 60% by weight of dioctyl adipate and the balance substantially an epoxidized vegetable oil having an oxirane content of about 5% to 7% and an iodine number of about 0.5 to 1.5.

References Cited by the Examiner

UNITED STATES PATENTS

| | | | |
|---|---|---|---|
| 2,427,513 | 9/47 | Spessard | 260—32.8 |
| 2,676,928 | 4/54 | Frank | 260—2.5 |
| 2,772,194 | 11/56 | Fisher et al. | 156—232 |
| 2,776,265 | 1/57 | Fuller | 260—2.5 |
| 2,884,668 | 5/59 | Harris et al. | 20—69 |
| 2,959,508 | 11/60 | Graham et al. | 156—78 |
| 3,038,217 | 6/62 | Harris | 20—69 |
| 3,055,846 | 9/62 | Flack | 260—2.5 |
| 3,127,640 | 4/64 | Streetman | 20—69 |
| 3,153,265 | 10/64 | Hosea et al. | 20—69 |

HARRISON R. MOSELEY, *Primary Examiner.*

GEORGE A. NINAS, Jr., *Examiner.*